United States Patent [19]

Rutt

[11] 4,349,210

[45] Sep. 14, 1982

[54] ANIMAL CART

[76] Inventor: Kenneth M. Rutt, 2146 Stonecrest Dr., Lancaster, Pa. 17601

[21] Appl. No.: 237,523

[22] Filed: Feb. 23, 1981

[51] Int. Cl.³ .............................................. B62B 1/14
[52] U.S. Cl. ............................ 280/47.21; 280/47.26; 414/457
[58] Field of Search ................. 280/43.1, 43.11, 43.24, 280/47.21, 47.23, 47.26; 414/425, 444, 446, 434, 435, 437, 485, 457; 119/102

[56] References Cited

U.S. PATENT DOCUMENTS 263,331  8/1882  Gard ............................ 280/47.23 X
2,905,481  9/1959  Schramm ...................... 280/43.11 X Primary Examiner—Joseph F. Peters, Jr.
Assistant Examiner—Michael Mar
Attorney, Agent, or Firm—B. P. Fishburne, Jr.

[57] ABSTRACT

A two wheel manually steered and propelled cart for transporting calves and for other uses around a farm is characterized by very sturdy economical construction including two end frames joined by corrugated metal panels. The manipulating handle for the cart has its two side arms pivotally attached to the front frame and releasably engageable with gravity-assisted latches on the rear frame to allow easy lowering and raising of the body of the cart. Two large ground wheels are journaled between the side members of the pivoted handle and parallel side members of a support yoke which is engaged with bearing elements on the front frame.

4 Claims, 7 Drawing Figures

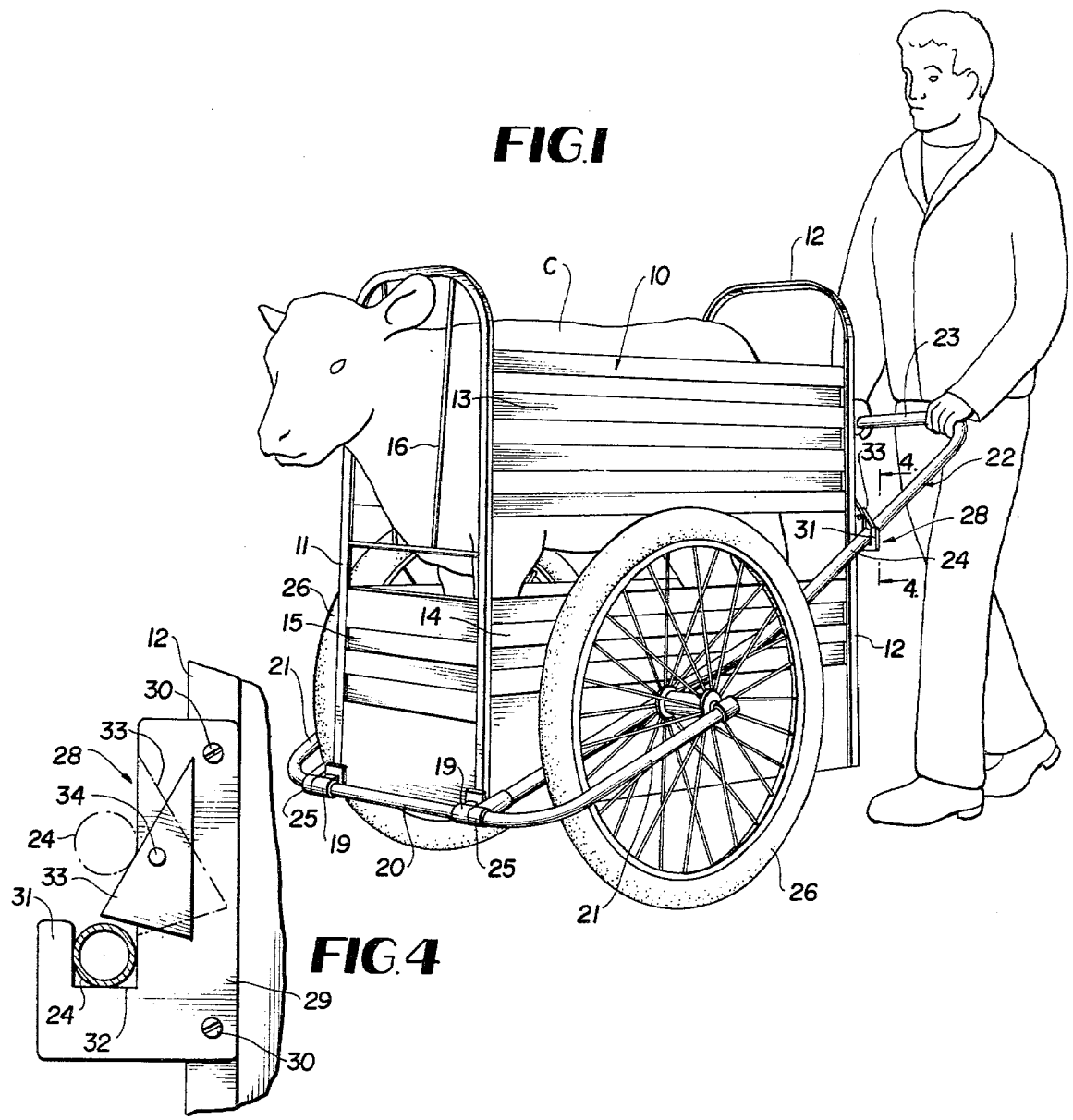
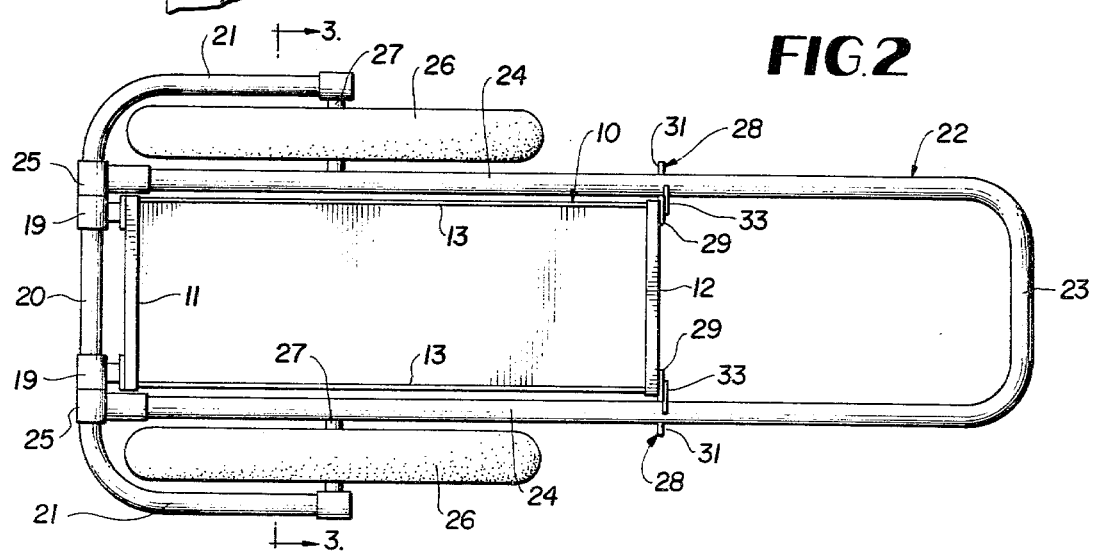

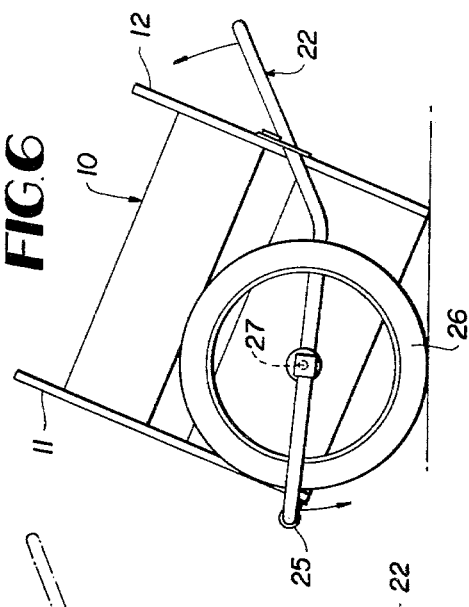
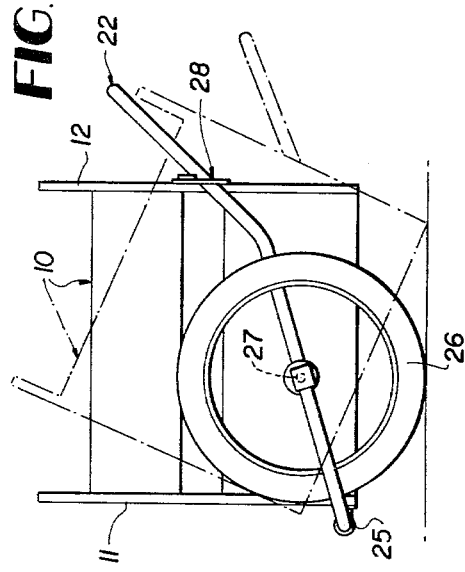
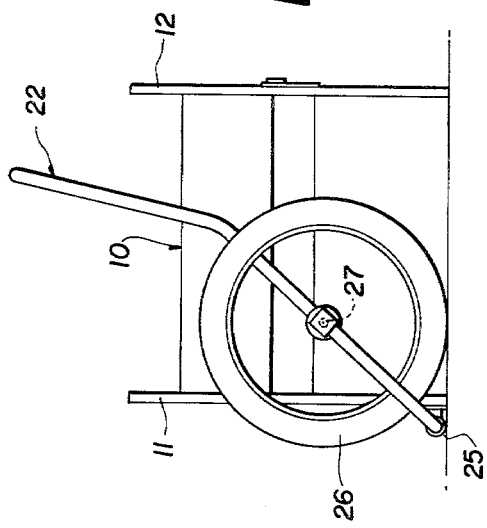
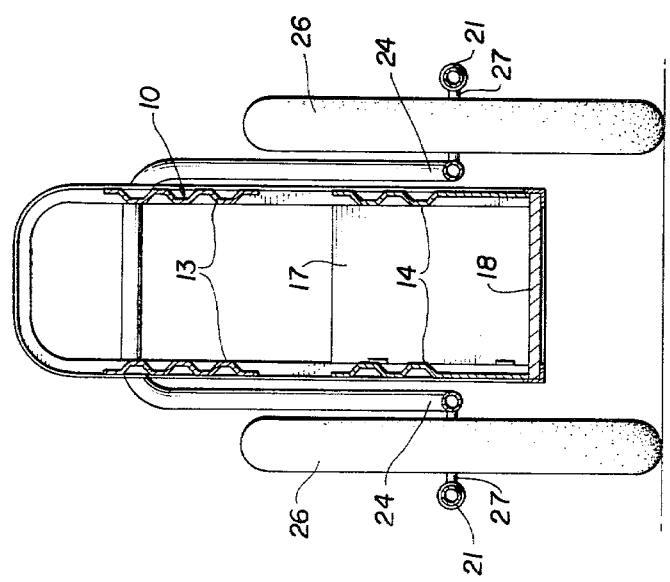

ANIMAL CART

BACKGROUND OF THE INVENTION

Hand propelled two wheel carts or dollies for a variety of purposes are known. For example, U.S. Pat. No. 1,105,228 shows a cart for transporting pig iron. Broadly similar transport devices are disclosed in each of U.S. Pat. Nos. 217,503; 779,913; 1,029,045; and 1,105,228.

None of the prior art structures is suitable for fulfilling the need satisified by the present invention, namely, the provision of a properly balanced cart for calves and the like which can be easily operated without strain by a walking attendant. The cart, according to the invention, has a stable box-like body of a proper size to accommodate a calf, and includes a rear entry gate, a level floor and a front V-yoke through which the head and neck of the animal may extend varying amounts, depending on the size of the animal, to aid in balancing the cart.

A unique feature of the invention is the provision on the rear frame of the cart body of a pair of gravity closing manually released latches which enable the user of the cart to conveniently load it while the cart body is resting on the ground, followed by depression of the control handle to its latched position and rocking of the cart forwardly on the wheel axis to an elevated level transport position.

Other features and advantages of the invention will become apparent during the course of the following detailed description.

BRIEF DESCRIPTION OF THE DRAWINGS

FIG. 1 is a perspective view of an animal cart according to the invention.

FIG. 2 is a plan view thereof.

FIG. 3 is a transverse vertical section taken on line 3—3 of FIG. 2.

FIG. 4 is an enlarged fragmentary vertical section taken on line 4—4 of FIG. 1.

FIGS. 5 through 7 are partly schematic side elevations of the cart depicting its operation.

DETAILED DESCRIPTION

Referring to the drawings in detail, wherein like numerals designate like parts, the numeral 10 designates a rectangular box-like cart body of proper dimensions to hold a calf C with safety and stability. The cart body comprises a front vertical metal frame 11 which is rigid and a similar rear frame 12. The two frames have their sides interconnected by sturdy corrugated metal panels 13 and 14 forming the two side walls of the body. A similar corrugated metal panel 15 is connected between the two side members of forward frame 11 to form a partial front wall. Above this front wall, the forward frame 11 includes a V-yoke 16 formed by two upwardly diverging bars whereby the head and neck of the calf may project through the yoke and forwardly of the frame 11 to aid in balancing the cart. At the elevation of the partial front wall 15, a rear horizontally swinging access gate 17 with conventional latching means is provided on the rear frame 12. The floor of the cart body 10 may be metal and, if desired, can be lined with wood 18.

A pair of aligned transverse axis bearings 19 are fixed to the bottom of forward frame 11 at the opposite sides thereof. These bearings receive rotatably the transverse bar member 20 of a U-shaped yoke having parallel side bars 21 connected with the cross member 20 and extending rearwardly.

An opposing U-shaped steering and manipulating handle 22 is provided, having a rear cross member 23 and side parallel arms 24. These arms extend forwardly in closely spaced relationship to the cart side walls and are secured as at 25 to the yoke cross member 20 immediately outwardly of the bearings 19. The handle 22 projects rearwardly of the cart body, as shown.

Large diameter pneumatic tired ground wheels 26 are disposed between yoke bars 21 and handle arms 24 and are rotatably connected therewith through conventional wheel axle means 27.

In accordance with a key feature of the invention, a pair of gravity-assisted latches 28 are mounted on the side members of rear frame 12 somewhat above the wheel axles and near the vertical center of the cart body. Each latch 28 includes a generally L-shaped mounting plate 29 secured by screws 30 to the adjacent side member of rear frame 12. An upright extension 31 on the outer side of plate 29 and outwardly of the cart body side wall forms a latching or retaining recess 32 for the adjacent handle side arm 24. A triangular keeper 33 is pivotally attached at 34 to the mounting plate 29 in an eccentric or unbalanced manner whereby gravity will cause one lower corner of the keeper 33 to assume a latching position above the arm 24 when the latter is depressed into the retaining recess 32. The keeper will swing on its pivot to the phantom line position shown in FIG. 4 to allow entry of the arm 24 into the latching recess. The keeper at proper times is swung manually to the release position by the attendant following the application of downward pressure on the rear of handle 22.

The simplified operation of the animal cart can best be understood and summarized by reference to FIGS. 5 through 7 of the drawings. FIG. 5 in full lines depicts the cart body 10 in the elevated level position as when transporting a calf under control of a walking attendant, as also shown in FIG. 1. The two latches 28 are actively engaged to resist elevation of the handle arms 24 from recesses 32.

To lower the cart body 10, preparatory for unloading it, the body can be tilted rearwardly, FIG. 6 and FIG. 5, by depressing the latch handle 22 and when the lower rear corner of the body engages the ground so as to relieve the load acting on the keeper plates 33, the latter can easily be swung by the fingers to their release positions shown in phantom lines in FIG. 4. This enables the attendant to carefully guide the handle 22 upwardly from the latched position and the handle will swing forwardly to the position shown in FIG. 7 where the floor of the body 10 will be resting solidly on the ground. The attendant does not have to lift the handle 22 but instead simply resists and controls its upward and forward swing induced by the load.

The rear gate 17 can now be opened for removal of the calf. After reloading the cart and closing its gate, the handle 22 is pulled rearwardly and downwardly to re-engage the latches 28 and by a reverse sequence of steps the cart is returned easily to the normal transport position of FIGS. 1 and 5.

It is to be noted that the wheel axles 27 are placed forwardly of center on the cart body 10 to compensate for the fact that more weight is borne by the animal's front legs than on its rear legs. This feature plus the provision of the yoke 16 renders the balancing of the cart quite precise so that surprisingly little effort is required for its manipulation in the above-described manner.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An animal cart comprising a box-like body portion of sufficient size to transport a calf and having a gate at one end thereof, a U-shaped supporting yoke pivotally connected to the front of said body portion near the floor thereof, a U-shaped steering and manipulating handle for the cart extending rearwardly thereof for grasping by a walking attendant and including a pair of side arms disposed near and outwardly of the opposite side walls of the body portion and having forward ends connected to said yoke, a pair of ground wheels for the cart journaled between said handle arms and side members of said yoke, and a pair of latches on the rear of said body portion including upwardly opening latching recesses for said handle arms and pivoted keepers which are biased by gravity to active latching positions above said arms when said arms are moved by the walking attendant downwardly into said latching recesses wherein said supporting yoke and said handle are rockable in unison on the axis of said ground wheels to effect raising and lowering of the body portion.

2. An animal cart as defined in claim 1, and the front wall of the body portion containing an opening through which the head and neck of a calf can extend forwardly of the body portion, and the axis of said pair of wheels being disposed forwardly of the longitudinal center of the body portion.

3. An animal cart as defined in claim 1, and said body portion including front and rear upstanding frames, and side wall panels rigidly connected between side members of the frames.

4. An animal cart as defined in claim 1, and said latches each comprising a generally L-shaped plate fixed to the rear of said body portion and projecting laterally outwardly thereof and having an upturned part defining the outer margin of each latching recess, and each pivoted keeper comprising a triangular plate element eccentrically pivotally secured to said L-shaped plate and biased by gravity so that one base forming edge of the triangular plate element is disposed above one of said arms.

* * * * *